United States Patent

[11] 3,585,855

| [72] | Inventor | Robert V. Albertson |
| | | Wayzata, Minn. |
| [21] | Appl. No. | 819,807 |
| [22] | Filed | Apr. 28, 1969 |
| [45] | Patented | June 22, 1971 |
| [73] | Assignee | Victor N. Albertson |
| | | South Minneapolis, Minn. |
| | | a part interest |

[54] VEHICLE ENGINE TESTING APPARATUS
2 Claims, 6 Drawing Figs.

| [52] | U.S. Cl. | 73/117 |
| [51] | Int. Cl. | G01l 5/13 |
| [50] | Field of Search | 73/117, 123, 126; 73/124 |

[56] References Cited
UNITED STATES PATENTS

| 3,180,138 | 4/1965 | Hundley | 73/117 |

FOREIGN PATENTS

| 190,010 | 12/1922 | Great Britain | 73/117 |
| 674,483 | 3/1939 | Germany | 73/117 |

*Primary Examiner*—Jerry W. Myracle
*Attorney*—Merchant & Gould

ABSTRACT: A portable power-testing apparatus for small engine-driven vehicles, having treadmill means for supporting engagement with vehicle-driving wheels or drive tracks, and a fluid pump driven by the treadmill means to provide a test load. A tachometer is connected to the treadmill means to register apparent vehicle speeds, and a valve is operative to regulate the flow of fluid delivered by the pump.

PATENTED JUN 22 1971
3,585,855
SHEET 1 OF 2
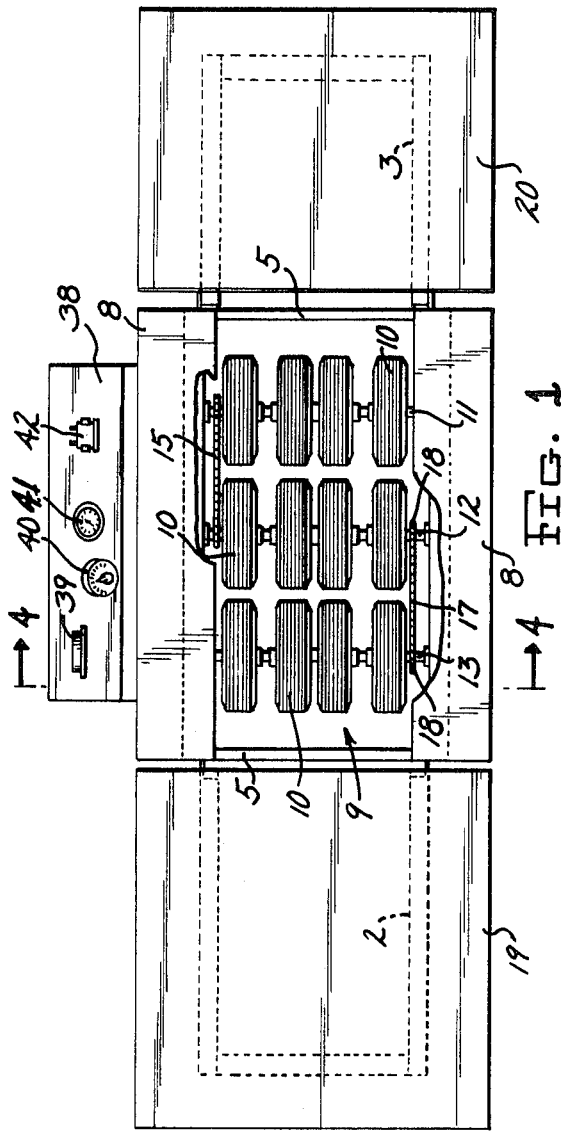
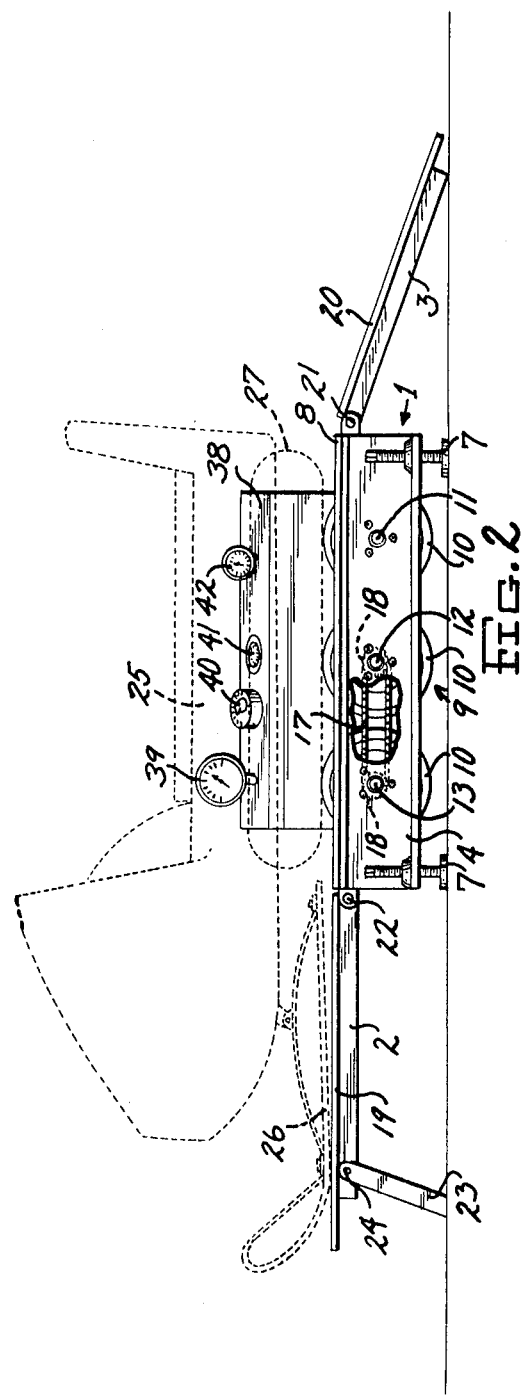
INVENTOR.
Robert V. Albertson
BY
Merchant & Gould
ATTORNEYS INVENTOR.
Robert V. Albertson
BY
Merchant & Gould
ATTORNEYS 3,585,855

VEHICLE ENGINE TESTING APPARATUS

BACKGROUND OF THE INVENTION

Heretofore, in testing of smaller vehicles, such as motorcycles, scooters and snowmobiles, for power output, such testing has been by road or field travel, or on expensive and stationary dynamometer apparatus. In the case of snowmobiles particularly, road or field testing can be accomplished only on ice or when the ground is know covered. Further, most dynamometers for testing automotive vehicles, such as motorcars and trucks, are not adapted to mount smaller vehicles of the type mentioned above for testing.

SUMMARY OF THE INVENTION

An important object of this invention is the provision of a testing apparatus for snowmobiles, motorcycles, scooters and similar small vehicles, which can be operated with equal facility by vehicle drive wheels and endless drive tracks.

Another object of this invention is the provision of testing apparatus which can be easily transported from place to place and which requires no connections to an outside source of power, other than that of the vehicle being tested.

Another object of this invention is the provision of testing apparatus as set forth, which can be inexpensively produced, which is efficient in operation, and which is rugged in construction and durable in use.

To the above ends, I provide a generally rectangular frame having treadmill means for supporting the drive track or wheels of a vehicle and adapted to be driven by the vehicle, a fluid pump driven by the treadmill means, a fluid control valve, a fluid pressure indicator, and a tachometer connected to the treadmill means for registering the apparent speed of the vehicle being tested. The apparatus further includes a ramp at one end and a platform at its opposite end for supporting the nondriving portions of vehicles being tested, the ramp and platform being movable between operative positions and the folded transport or storage position. The apparatus is supported by vertically adjustable legs for operation and transport, selectively.

DESCRIPTION OF THE DRAWINGS

FIG. 1 is a view in top plan of the vehicle engine testing apparatus of this invention, some parts being broken away;

FIG. 2 is a view in front elevation, some parts being broken away;

DESCRIPTION OF THE PREFERRED EMBODIMENT

Figure 3:
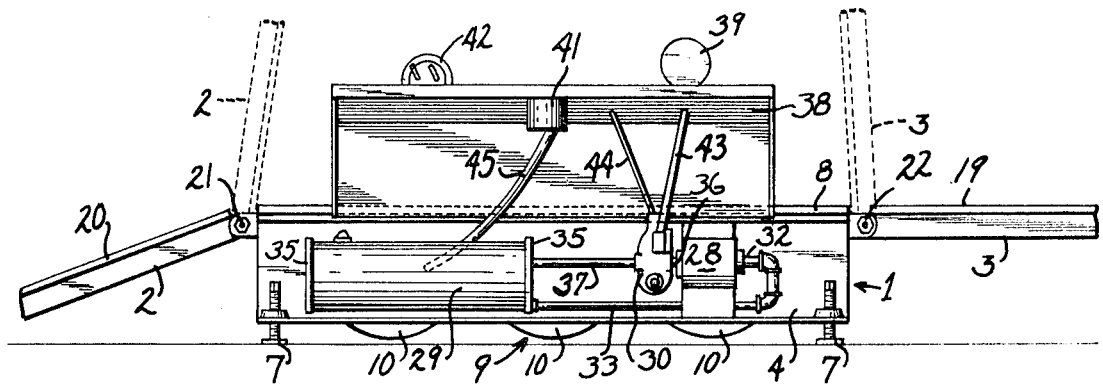
FIG. 3 is a fragmentary view in rear elevation.

In the embodiment of the invention illustrated, a frame structure is shown as comprising a rigid generally rectangular frame 1 and a pair of generally U-shaped end frames 2 and 3, the frame 1 including a pair of laterally spaced longitudinal frame members 4 connected at their opposite ends by upper cross frame members 5 and lower end or cross frame members 6. Preferably the frame 1 is made from commercially available channel and angle iron or similar structural material, the frame members being rigidly secured together by welding or other suitable means. The frame 1 is supported by a plurality of foot-equipped screw-threaded legs 7 that are vertically adjustable, whereby to raise or lower the frame 1 and parts carried thereby. A pair of horizontally disposed platelike skids 8 extend longitudinally of the frame 1 and are bolted or riveted adjacent their inner edges to the upper portions of the frame members 4.

Figure 4:
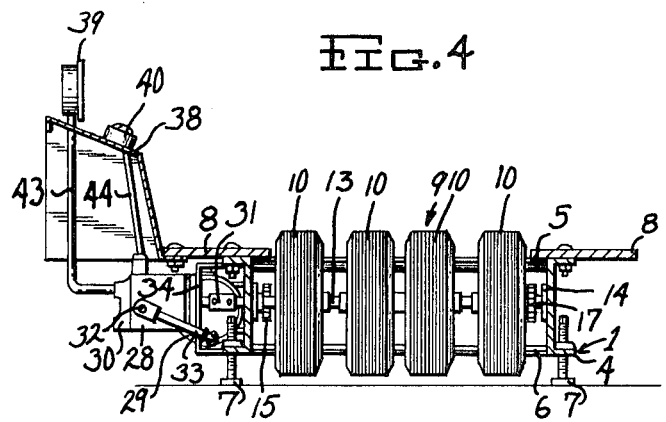
FIG. 4 is a transverse section taken substantially on the line 4—4 of FIG. 1.
Figure 5:
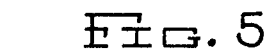
FIG. 5 is a fragmentary view in top plan of the frame and ramp, some parts being broken away and some parts being shown in section.
Figure 6:
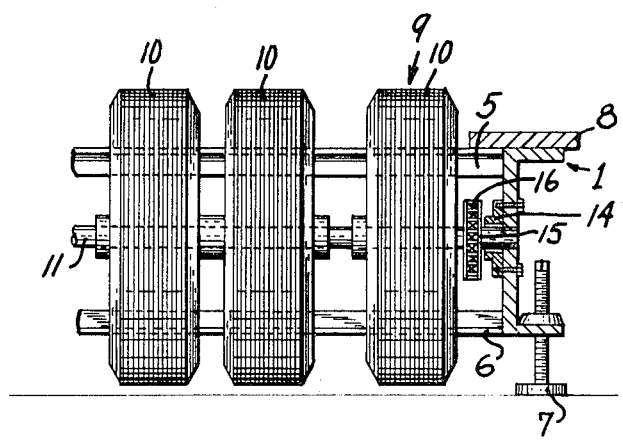
FIG. 6 is an enlarged fragmentary transverse section taken on the line 6—6 of FIG. 1.

Treadmill means, indicated generally at 9, comprises a plurality of transversely extending rows of pneumatic tire-equipped wheels 10, each row thereof being keyed or otherwise rigidly mounted on a different one of a plurality of horizontally disposed transverse shafts 11, 12 and 13. Each of the shafts 11—13 is journaled at its opposite end portions in bearings 14 bolted or otherwise rigidly secured to adjacent ones of the frame members 4. It will be noted that the several wheels 10 are so disposed to have their upper peripheral portions projecting slightly above the level of the skids 8, between the frame members 4. The shafts 11 and 12 are connected for common rotation by an endless link chain 15 entrained over sprocket wheels 16 mounted fast on the shafts 11 and 12, see FIGS. 1, 4 and 7. In like manner, the shafts 12 and 13 are connected together for common rotation by an endless link chain 17 entrained over sprocket wheels 18 mounted fast on the shafts 12 and 13, the sprocket wheels 18 being shown in FIG. 1 and by dotted lines in FIG. 2.

A pair of generally rectangular platelike members 19 and 20 are bolted or otherwise rigidly secured to the generally U-shaped end frames 2 and 3 respectively, the end frame 3 and member 20 being hingedly secured to the adjacent end of the frame 1, as indicated at 21, for swinging movements between a generally upright inoperative position shown by dotted lines in FIG. 3, and a longitudinally outwardly and downwardly sloping position, as shown by full lines in FIGS. 2 and 3, to provide a ramp upon which a vehicle may be moved from the ground to the treadmill means 9. The end frame 2 and its cooperating platelike member 19 are hingedly mounted on the opposite end of the frame 1, as indicated at 22, for movements between a generally upright inoperative position, indicated by dotted lines in FIG. 3, and a longitudinally outwardly extending generally horizontal operative position shown by full lines in FIGS. 2 and 3, whereby to provide a supporting platform for a portion of a vehicle not carried by the treadmill means 9. At its longitudinally outer end portion, the end frame 2 is provided with supporting leg structure 23, pivotally mounted to the end frame 2, as indicated at 24, whereby to support the end frame 2 and platelike member 20 in its generally horizontal operative position, see FIG. 2. A vehicle to be tested, such as a commercially available snowmobile, is shown by dotted lines in FIG. 2, the vehicle comprising an elongated frame structure 25 supported at its front end by a pair of laterally spaced ski assemblies 26, one of which is shown, and for the most part by an endless flexible drive track 27 of well-known construction. As shown in FIG. 2, the drive track 27 rests upon at least some of the wheels 10 of the treadmill means 9, the ski assemblies 26 resting on the platelike member 19. Other types of vehicles such as motorcycles or motor scooters, not shown, may be assumed to be supported on the apparatus in much the same manner, with the rear driving wheels operatively engaging given ones of the treadmill wheels 10, the nondriven wheels of the vehicles being supported on the platelike member 19. If desired, suitable means, not shown, may be employed to releasably hold the vehicles against forward movement relative to the frame 1, during testing of the vehicles. The skid members 8 support the ski assemblies 26 when the snowmobile is driven toward or away from operative position shown in FIG. 2 and serve as supports for an operator's feet when a two-wheeled vehicle, such as a motorcycle or scooter, not shown, is driven onto or off from the treadmill means 9.

A fluid circuit for imposing a load on the treadmill means 9 comprises a fluid pump 28, a generally cylindrical fluid reservoir 29 and a metering valve 30. The pump 28 is a conventional rotary positive displacement hydraulic pump and is operatively connected to the shaft 13 by a coupling 31 and has a fluid inlet 32 connected to the reservoir 29 by an inlet pipe 33. The pump 28 is supported by suitable means, such as a U-shaped bracket 34 connected to the rear side frame member 4, the reservoir being mounted to the adjacent rear frame member 4 by platelike mounting members 35, see FIG. 3. A discharge outlet 36 from the pump 28 is connected to the metering valve 30 which in turn is connected to the reservoir 29 by a return line 37.

A control panel 38 is mounted on the skid 8 at the rear side of the frame 1, and carries a pressure indicator 39, a valve control element or knob 40, and a pair of tachometers 41 and 42. The pressure indicator 39 is connected to the metering valve 30 by means of a pipe or conduit 43 and may be assumed to communicate with the fluid circuit intermediate the discharge or outlet 36 of the pump 28 and valve 30. The control knob or element 40 is operatively connected to the metering valve 30 by a control shaft 44, and the tachometer 41 is connected to the treadmill shaft 11 by a flexible shaft 45. The second tachometer 42 is adapted to be operatively connected to the engine or drive train of the vehicle to be tested, if desired, the tachometer 41 being used to indicate the apparent road speed of the vehicle.

When it is desired to test a vehicle engine, the vehicle is mounted on the treadmill means 9, suitably anchored to prevent driving movement of the vehicle relative to the frame 1, and the second tachometer 42 operatively connected to the vehicle engine. The engine is then energized and the drive wheel or track set into motion at a predetermined normal cruising speed. The valve control 40 is manipulated to cause an increase in pressure load on the pump 28, which is driven by the treadmill means, to a maximum which the vehicle engine will overcome without reducing the speed of the treadmill means as indicated on the treadmill tachometer 41. Whatever desired work on the vehicle engine, such as replacement of parts, engine tuning or addition of special power equipment, is then done, and the vehicle again put into operation. By comparing the speed and pressure indicated on the treadmill tachometer 41 and pressure indicator 39 respectively, with that shown before work was done on the vehicle engine, the operator or user can quickly determine the results of the tuneup or other work done on the engine. These results will also show up in engine speeds, as indicated on the second tachometer 42. By increasing the pressure load on the pump 28 through manipulation of the metering valve control 40, the operator can determine generally the increase in driving power put forth by the vehicle due to the work done on the vehicle engine. Thus, the vehicle can be worked on and road tested in a shop without the necessity for outdoor road testing.

When it is desired to move the apparatus, the legs 7 may be moved upwardly relative to the frame 1 until the several treadmill wheels 10 rest upon the ground. Then, with the end frames 2 and 3 folded upwardly to their inoperative positions and the metering valve 30 opened to impose minimum load on the pump 28, the apparatus may be easily rolled on the several wheels 10 to any desired location, after which the several legs 7 are screwed downwardly until the wheels 10 are again upwardly spaced from the ground.

What I claim is:
1. Portable vehicle engine testing apparatus comprising:
   a. a frame structure;
   b. a plurality of generally horizontally disposed parallel shafts extending transversely of and journaled in said frame structure;
   c. a plurality of pneumatic tire equipped wheels mounted on each of said shafts in closely spaced side-by-side relationship for common rotation with their respective shafts;
   d. means positively connecting all of said shafts together for common rotation of all of said wheels;
   e. said wheels being disposed to at least partially support the weight of a vehicle to be tested, said shafts being disposed to have the wheels of at least two of said shafts in supporting and running contact with the ground-engaging drive mechanism of the vehicle to be tested and to be driven by said drive mechanism;
   f. a fluid circuit including a pump operatively connected to said wheels to be driven by a vehicle on the wheels, control valve means for varying the pressure of fluid delivered by the pump whereby to vary the load imposed upon the vehicle drive means by said wheels, and fluid pressure indicator mounted on said frame structure and connected in said circuit;
   g. and a tachometer on said frame structure operatively connected to said wheels to register the apparent speed of a vehicle when driving said wheels.

2. The engine-testing apparatus defined in claim 1 in which said wheels have lower portions projecting downwardly from said frame structure, characterized by vertically adjustable legs mounted on said frame structure for movements between operative positions, wherein said lower wheel portions are upwardly spaced from the ground, and raised inoperative positions, wherein said lower wheel portions engage the ground for rolling movement thereover.